(12) United States Patent
Suendermann et al.

(10) Patent No.: US 8,831,208 B2
(45) Date of Patent: Sep. 9, 2014

(54) SYSTEM AND METHOD FOR OPTIMIZING CALL FLOWS OF A SPOKEN DIALOG SYSTEM

(75) Inventors: David Suendermann, New York, NY (US); Jackson Liscombe, Brooklyn, NY (US); Jonathan Bloom, Maplewood, NJ (US); Grace Li, New York, NY (US); Roberto Pieraccini, New York, NY (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 245 days.

(21) Appl. No.: 13/242,695

(22) Filed: Sep. 23, 2011

(65) Prior Publication Data

US 2013/0077767 A1 Mar. 28, 2013

(51) Int. Cl.
*H04M 3/00* (2006.01)

(52) U.S. Cl.
USPC .................. 379/272; 379/88.01; 379/265.11; 379/273; 704/238

(58) Field of Classification Search
USPC .................. 379/88.01–88.04, 271–273, 311, 379/265.01–266; 370/352; 455/501; 704/E15.04, 238, 240
See application file for complete search history.

(56) References Cited

U.S. PATENT DOCUMENTS

| | | | |
|---|---|---|---|
| 8,396,056 B2 * | 3/2013 | Dalton et al. | 370/352 |
| 2012/0108276 A1 * | 5/2012 | Lang et al. | 455/501 |

OTHER PUBLICATIONS

D. Suendermann, J. Liscombe, R. Pieraccini: "Minimally Invasive Surgery for Spoken Dialog Systems." In Proc. of the Interspeech 2010, 11th annual Conference of the International Speech Communication Association, Makuhari, Japan, Sep. 2010.
D. Suendermann, J. Liscombe, and R. Pieraccini: "Contender." In Proc. of the SLT 2010, IEEE Workshop on Spoken Language Technology, Berkeley, USA, Dec. 2010.
D. Suendermann, J. Liscombe, J. Bloom, G. Li, and R. Pieraccini: "Deploying Contender: Early Lessons in Data, Measurement, and Testing of Multiple Call Flow Decisions." In Proc. of the HCI 2011, IASTED International Conference on Human-Computer Interaction, Washington, USA, May 2011.
D. Suendermann, J. Liscombe, J. Bloom, G. Li, and R. Pieraccini: "Large-Scale Experiments on Data-Driven Design of Commercial Spoken Dialog Systems." In Proc. of the Interspeech 2011, 12th Annual Conference of the International Speech Communication Association, Florence, Italy, Aug. 2011.
D. Suendermann: "Advances in Commercial Deployment of Spoken Dialog Systems." Published: Feb. 23, 2011.
K. Acomb, J. Bloom, K. Dayanidhi, P. Hunter, P. Krogh, E. Levin, and R. Pieraccini: "Technical Support Dialog Systems: Issues, Problems, and Solutions." HLT 2007 Workshop: Bridging the Gap: Academic and Industrial Research in Dialog Technology, Rochester, NY, USA, Apr. 26, 2007.

(Continued)

*Primary Examiner* — Md S Elahee
(74) *Attorney, Agent, or Firm* — Frommer Lawrence & Haug LLP; William S. Frommer

(57) ABSTRACT

A dialog manager for a spoken dialog system. A decision module selects a path from a plurality of alternative paths for a given call, wherein each path implements one of a plurality of strategies for a call flow. A weighting module weights the path selection decision and is connected to a probability estimator for estimating the probability value that a given one of the plurality of paths is the best-performing path.

25 Claims, 6 Drawing Sheets

(56) References Cited

OTHER PUBLICATIONS

D. Suendermann: "Speech Scientists Are Dead. Interaction Designers Are Dead. Who Is Next?" [cached]. In Newsletter of the SLTC, Speech and Language Processing Technical Committee of the IEEE Signal Processing Society, Apr. 2010.

D. Suendermann: "Five Techniques Multi-Modal Apps (Should) Inherit from Speech Science." In Proc. of the AVIxD 2010, $9^{th}$ Annual Workshop of the Association for Voice Interaction Design, New York, USA, Aug. 2010.

* cited by examiner

US 8,831,208 B2

SYSTEM AND METHOD FOR OPTIMIZING CALL FLOWS OF A SPOKEN DIALOG SYSTEM

FIELD OF THE INVENTION

The present disclosure relates to systems and methods of automated spoken dialog interaction systems using speech recognition, such as Spoken Dialog Systems or Interactive Voice Response.

DISCUSSION OF RELATED ART

Automatic spoken dialog systems are often very complex. They may consist of hundreds of dialog states involving extensive dialog structures, have system integration functionality that communicates with backend databases or devices, support multiple input and output modalities, and can sometimes handle calls over more than 20 minutes in duration. In order to keep a caller engaged in such environments, the use of human-like speech processing is critical, e.g., the incorporation of various degrees of spoken language understanding, mixed-initiative handling, and dynamic response generation.

Spoken dialog systems are often designed to emulate a human agent's role in the complexity of the services offered as well as in the length of interaction. At the same time, as dialog systems improve, so too do the expectations of callers. Several characteristics of modern dialog system design encourage callers to behave as if they were interacting with a human agent. Such characteristics include open-ended questions during the conversation and global commands such as "help" and "repeat" at every point in the dialog. This design encourages callers to say things that are not explicitly prompted by the context prompts in the dialog system. Furthermore, directed dialog prompts in which callers are asked to choose an item from a list often unintentionally elicit out-of-scope utterances from callers by offering choices that may be incomplete, too vague, or too specific.

SUMMARY OF THE INVENTION

Disclosed is a dialog manager for a spoken dialog system including a computer, a processor, and memory, comprising: a decision module for selecting a path from a plurality of alternative paths for a given call, wherein each path implements one of a plurality of strategies for a call flow; and a weighting module for weighting the path selection decision, wherein the weighing module is operatively connected to a probability estimator for estimating a probability value that a given path of the plurality of paths is the best-performing path, wherein incoming calls are directed to each of the alternative paths selected by the decision module.

Also disclosed is a call flow method comprising selecting a subset of incoming calls for live implementation of alternate strategies for an activity a call flow for a spoken dialog system; configuring a set of weights to determine how the calls will be distributed among the strategies, and distributing the calls among the strategies in accord with the weights. The method can further comprise distributing calls among the strategies by winning probabilities. The method can also comprise dynamically adjusting the weights for distributing the calls based on actual performance of the strategies. The method further can comprise dynamically adjusting the weights for distributing the calls based on call parameter Also disclosed is a call flow method for a spoken dialog system comprising a computer, a processor and a memory comprising configuring a plurality of competitor strategies for an activity of a call flow for a spoken dialog system; implementing the plurality of competitors for the activity in the spoken dialog system; wherein the system is configured to perform the method including selecting a strategy a based on a reward function. In another embodiment the system is configured perform the method further comprising selecting a path from a plurality of alternative paths for a given call, wherein each path implements one of the plurality of competing strategies for the call flow. The system is further the system is configured perform the method further comprising: weighting the path selection decision with weights including a probability value that a given path of the plurality of paths is the best-performing path; and directing calls to each of the alternative paths in accord with the weights.

DETAILED DESCRIPTION OF THE INVENTION

It is noted that in this disclosure and in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used herein, the indefinite article "a" or "an" and the phrase "at least one" shall be considered, where applicable, to include within its meaning the singular and the plural, that is, "one or more."

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Disclosed are systems and methods for optimizing call flows in a spoken dialog system.

The design of commercial spoken dialog systems is most commonly based on hand-crafting call flows. Voice interaction designers write prompts, predict caller responses, set speech recognition parameters, implement interaction strategies, all based on "best design practices".

Figure 1:
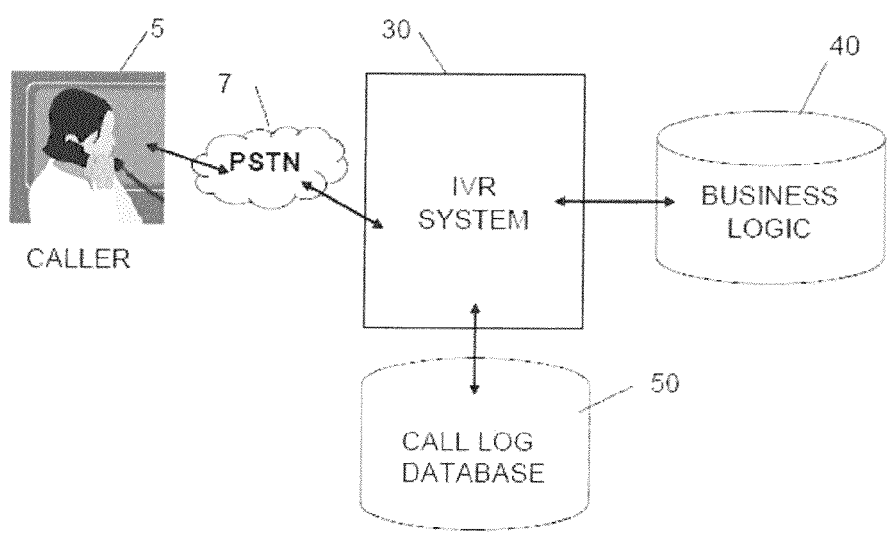
FIG. 1 is a high level architecture and flow for a spoken dialog system.
Figure 2:
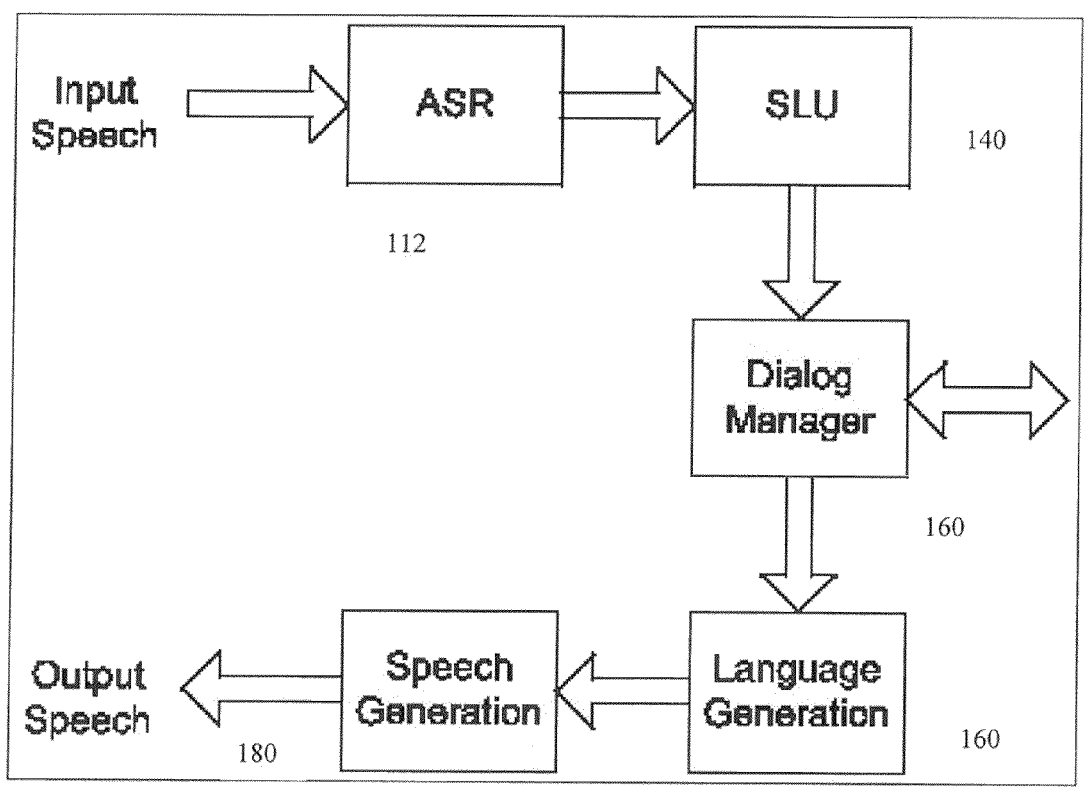
FIG. 2 is another high level architecture and flow for a spoken dialog system.

FIGS. 1 and 2 each show a high level architecture and flow for a spoken dialog system. As shown in FIG. 1, a caller 5 connects, via the public telephone network (PSTN) 7, or any other voice network (e.g. local network, or VoIP), to an interactive voice response (IVR) system 30. The IVR system is controlled by business logic 40, which determines, upon the interpretation of the caller's speech, which prompt to play or which other action to perform (for instance, the IVR can be connected to another system, not shown in the figure, and request additional services or information in order to appropriately address the problem). Typically the business logic is implemented through a call-flow, which includes the actions (e.g. voice prompts, database lookup, etc. . . . ) to execute in response to a caller's voice request or answer. For each turn of the interaction, the IVR consults the business logic in order to plan and execute the next action.

The IVR is also connected to a call log database 50 which stores relevant information about calls handled. This information is generally used for monitoring and billing for the IVR usage. Among other types of information, the call log database may include a categorization of each call based on the degree of success of the call in resolving a specific caller's customer care issue. For example, the IVR hosting company may charge a fee to the enterprise for the customer care service provided for each successfully completed call, as reported in the call log database. The information in the call log database may also or alternatively be used for assessing the overall quality and effectiveness of the IVR, improving it, or monitoring unpredicted changes in the environment (e.g. outages in the services provided).

FIG. 2 shows another high level architecture for a spoken dialog system. A spoken dialog system 1 generally consists of five main components:
  speech recognition (ASR) 112,
  spoken language understanding (SLU) 120,
  dialog manager 140,
  language generation 160,
  speech generation (text-to-speech synthesis or pre-recorded prompt player) 180.
In many IVRs, the language generation component is part of the dialog manager.

While ASR and SLU on the one hand and language generation and TTS on the other hand serve as the interfaces between human and machine, the dialog manager can be regarded as the "brain" of the machine. It hosts system logic and knowledge, integrates with external knowledge bases and is able to perform a wide spectrum of activities, run programs, send e-mails, initiate call-backs, measure signal strength, and reboot devices to name only a few.

Figure 3:
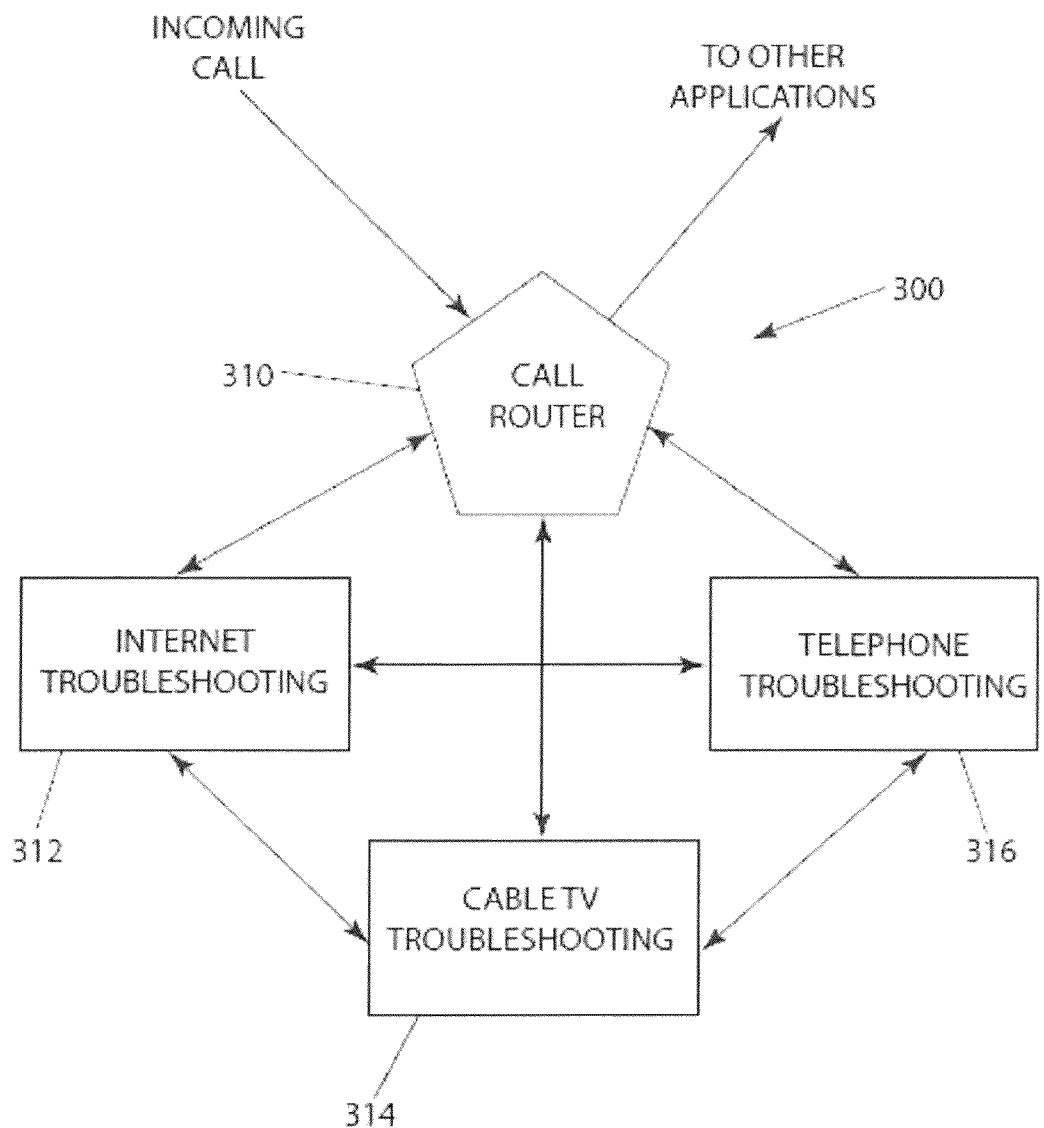
FIG. 3 shows the architecture of a system on which embodiments may be implemented.

FIG. 3 shows an exemplary embodiment of a dialog application 300 comprising four individual dialog systems interacting with each other. In the exemplary embodiment, they are implemented in a "customer care" telephone portal of a large service provider (e.g. a cable service provider).

When customers call the hotline of the service provider, they are connected to a top-level call router 310 whose task is to determine the call reason and route the callers to the appropriate destination. It will be noted that as shown the call router, and the individual troubleshooters are separate spoken dialog systems with separate dialog managers. It is, however, possible that can all be included comprised in a single system. This is done by accessing the callers' account information (using their telephone number as an identifier) and then asking either a general opening question such as "Briefly tell me what you're calling about today," or a caller-specific question such as "It looks like you called recently about your account. Are you calling about that now?" Depending on the caller response to the opening question and, potentially, to one or more follow-up questions, the most appropriate routing point is determined, and the call is transferred. If the call is about a technical problem with one or more of the provider's services (e.g., broadband Internet 312, cable TV 314, or telephone 316), the call is connected to one of the three respective troubleshooting dialog systems 312, 314, 316. If customers face problems with more than one service, they can be interconnected to one of the other troubleshooting dialog systems 312, 314, 316 or back to the call router 310.

Figure 4:
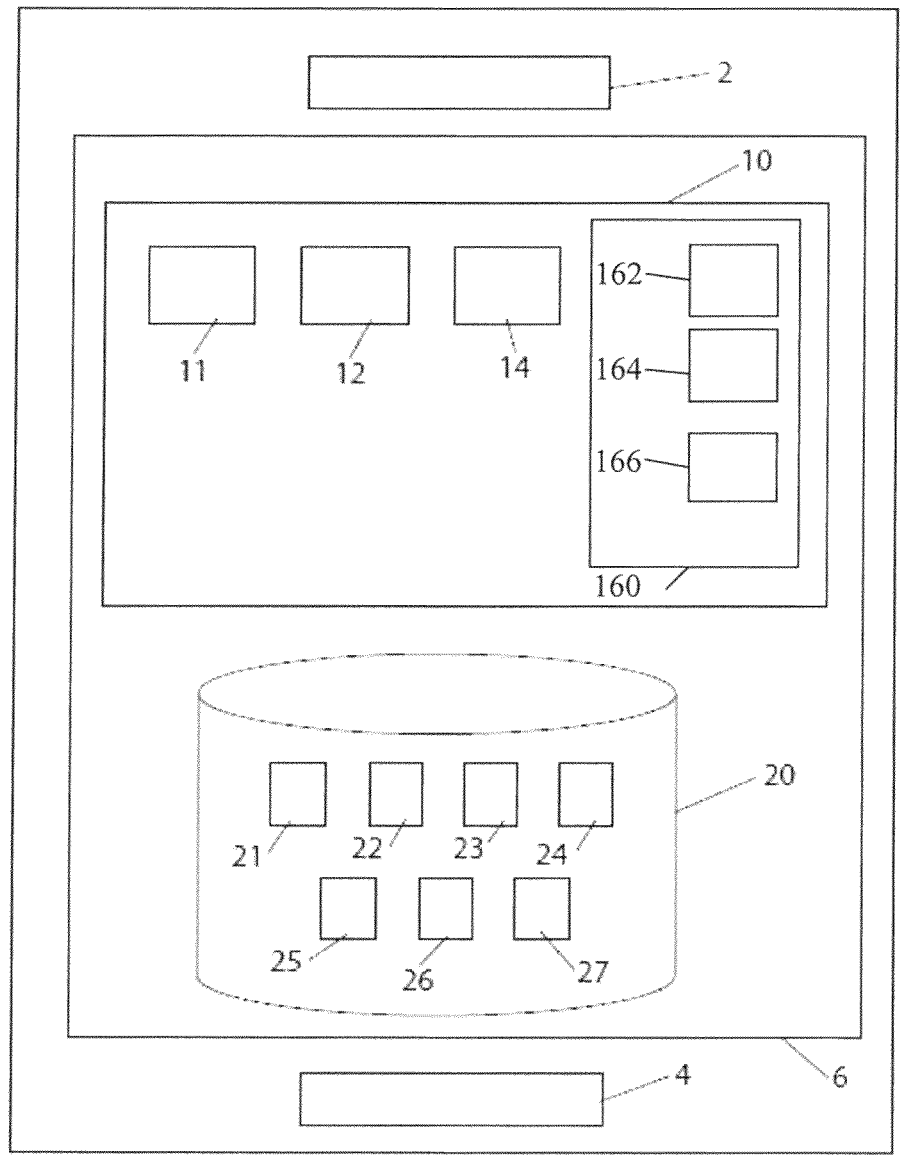
FIG. 4 shows a system overview for a system according to an embodiment of the invention.

FIG. 4 shows another embodiment of a system overview of a spoken dialog system. As disclosed therein a spoken dialog system 1, comprises a computer including a signal input/output, such as via a network interface 2, for receiving input such as an audio input, a processor 4, and memory 6, including program memory 10. The system 1 may be implemented on a general-purpose computer under the control of a software program. Alternatively, the system 1 can be implemented on a network of general-purpose computers and including separate system components, each under the control of a separate software program, or on a system of interconnected parallel processors. Although complex, it is believed that suitable software for performing the various functions described herein can be designed and constructed by computer programmers of ordinary skill.

The system 1 includes a speech recognition engine (i.e. a speech recognizer) 140. The system also includes data storage memory 20 including a number of data stores 21, 22, 23, 24, 25, 26, 27 which can be hosted in the same computer or hosted in a distributed network architecture. Grammars are held in a grammar data store (not shown). The system 1 includes a data store for a plurality of utterances 22 received via the audio input. The system 1 further includes a classifier component including a classifier data store 23 comprising a set of semantic classifiers (i.e., an initial set of classifiers), as well as a semantic classifier program 14 for, when executed by the processor, mapping the set of utterances processed by the speech recognizer 12 to the set of semantic classifiers.

The system can also include a logging component including logging program 11 for, when executed by a processor, logging and storing data associated with the collected set of utterances. A logging data store 21 can store instances of speech recognition events identified by the speech recognition device at the semantic classifiers together with logging data for the semantic classifiers. Instances of utterance recognition events at these classifiers can be stored together with logging data including the name and version of the classifier(s) active, the semantic class resulting in the highest classification score of the current utterance, the state in which the utterance was recognized, the speech recognizer's hypothesis of the respective utterance, acoustic and semantic confidence scores of the respective utterance, the speech data itself, the spoken dialog system's version and additional information about the system, the caller, and the utterance.

The logging data store 21 also includes relevant information about calls handled in a predefined period of time (e.g.

hours, days, or months). This information is generally used for monitoring and billing for the IVR usage. Among other types of information, the call log database may include a categorization of each call based on the degree of success of the call in resolving a specific caller's customer care issue. For example, the IVR hosting company may charge a fee to the enterprise for the customer care service provided for each successfully completed call, as reported in the call log database. The information in the call log database may also or alternatively be used for assessing the overall quality and effectiveness of the IVR, improving it, or monitoring unpredicted changes in the environment (e.g. outages in the services provided). Other non-limiting examples for logging entries are:

activities and processes the call went through the outbound transitions of activities and processes the caller's phone number (ANI) and the number he/she called (DNIS)

the call time the type/number/configuration of the caller's equipment (box, modem, router, computer, switch, DVR, remote control, etc.)

the return results of backend queries and services the caller's e-mail, address, payment details, account status, etc.

The system also includes a dialog manager 160, which includes at least one decision module 162, a weighting module 164, and a probability estimator operatively connected to the dialog manager.

Figure 5:
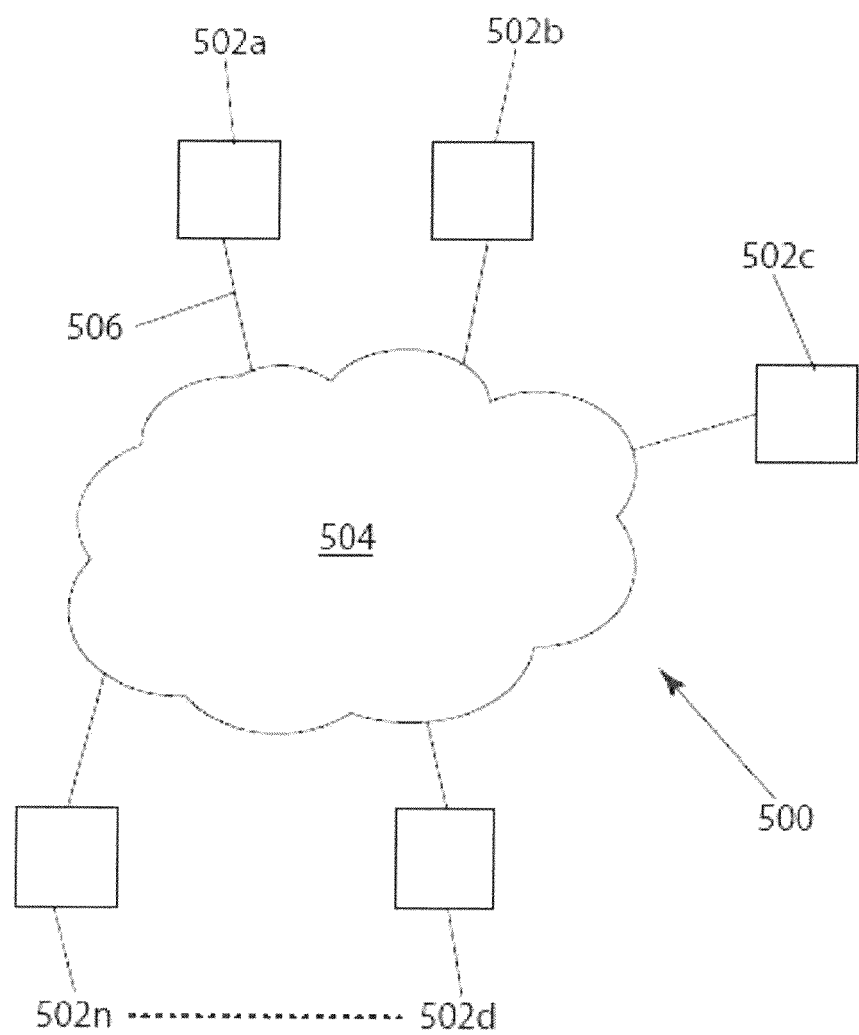
FIG. 5 shows an exemplary network environment adapted to support the present invention.

FIG. 5 shows a network environment 500 adapted to support the present invention. The exemplary environment 500 includes a network 504, and a plurality of computers, or computer systems 502 (a) . . . (n) (where "n" is any suitable number). Computers could include, for example one or more SQL servers. Computers 502 can also include wired and wireless systems. Data storage, processing, data transfer, and program operation can occur by the inter-operation of the components of network environment 500. For example, a component including a program in server 502(a) can be adapted and arranged to respond to data stored in server 502(b) and data input from server 502(c). This response may occur as a result of preprogrammed instructions and can occur without intervention of an operator.

The network 504 is, for example, any combination of linked computers, or processing devices, adapted to access, transfer and/or process data. The network 504 may be private Internet Protocol (IP) networks, as well as public IP networks, such as the Internet that can utilize World Wide Web (www) browsing functionality, or a combination of private networks and public networks.

A computer 502(a) for the system can be adapted to access data, transmit data to, and receive data from, other computers 502 (b) . . . (n), via the network or network 504. The computers 502 typically utilize a network service provider, such as an Internet Service Provider (ISP) or Application Service Provider (ASP) (ISP and ASP are not shown) to access resources of the network 504.

The computers 502 may be operatively connected to a network, via bi-directional communication channel, or interconnector, 506, which may be for example a serial bus such as IEEE 1394, or other wire or wireless transmission media. Examples of wireless transmission media include transmission between a modem (not shown), such as a cellular modem, utilizing a wireless communication protocol, or wireless service provider or a device utilising a wireless application protocol and a wireless transceiver (not shown). The interconnector 504 may be used to feed, or provide data.

The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

For example, a computer hosting 1 a dialog manager 160 including a decision module 164 and weighting module 164 may communicate to an external computer hosting a probability estimator 166 via local area networks, wide area networks, direct electronic or optical cable connections, dial-up telephone connections, or a shared network connection including the Internet using wire and wireless based systems. The probability estimator 166 can be implemented on external servers which compute the log data. The estimator 166 can then produce the weights as described herein and deliver them a weighting module 164 which, at runtime, controls a decision module 162 making sure that a percentage of routed traffic corresponds to the weights. In one embodiment, the probability estimator 166 can be an entire server cluster which implements when it comes to the parameter-dependent weighting.

It will be appreciated from the above that embodiments the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

Spoken dialog systems robust enough to be applicable to commercial deployments have employed a standardized framework by which a voice browser is used as the interface between the standard components of a dialog system. For instance, VoiceXML acts as a communication protocol between dialog manager and voice browser. VoiceXML is a language that controls which prompts to play, which language recognition and understanding models to invoke, and how to navigate between call states. Another straightforward paradigm for building spoken dialog systems is doing so in a systematic manual manner. Similar to handcrafting a decision tree, a call flow starts with a root activity that can, for instance, present an initial prompt to the caller. Depending on which caller responses can be output by the SLU 140, a number of conditional transitions, or paths, exit the root activity leading to other activities which do certain things before, again, exiting with a number of transitions. And so on and so forth. Generally, a call flow is a finite state machine whose nodes are activities and whose arcs are conditions, or paths. Most commercial implementations of spoken dialog systems are based on the call flow paradigm, i.e., a manually designed finite state machine whose nodes can be seen as activities and arcs as transitions or paths between these activities. Activities include:

interactions between the system and the user to gather or provide pieces of information, interactions between the dialog system and other systems in local or wide area networks (backend databases, outage detection modules, line quality check, mesh-up web services, telephony network, etc.), any type of internal processing (running scripts, performing calculations, making random or conditional decisions, etc.).

The introduction of WYSIWYG tools for the generation of call flows through graphical interfaces also came with mechanisms for directly producing VoiceXML code from the graphical call flow representation. More advanced techniques produce code that is run on web servers generating VoiceXML code dynamically during application run time. These tools enable quick bootstrapping of new applications. Call flows can be organized in hierarchical levels of arbitrary depth thereby allowing for highly complex applications (e.g., an Internet troubleshooting application involving over 2000 activities invoking more than 10000 pre-recorded system prompts and almost 1000 distinct language models and semantic classifiers as described in K. Acomb, J. Bloom, K. Dayanidhi, P. Hunter, P. Krogh, E. Levin, and R. Pieraccini, "Technical Support Dialog Systems: Issues, Problems, and Solutions," in *Proc. of the HLT-NAACL*, Rochester, USA, 2007, the entirety of which is incorporated by reference hereby).

Rapidly prototyping, building, and maintaining spoken dialog systems of this scale in a manual fashion do not result in optimal performance as designers mostly rely on their own experience or that of experts from the field or on heterogeneous knowledge sources (analysis results from similar applications, psychology research, inference). Call flow portions are implemented in an ad-hoc fashion because designers know that there is no prior knowledge available for the specific topic they are working on. Answers to how to exactly phrase a prompt;
whether to use an open-ended prompt, directed dialog, or a yes/no question;
in which order questions are asked and backend queries and actions are performed;
how to set activity parameters such as rejection and confirmation thresholds, sensitivity, time-out;
when to escalate a caller to a human operator; etc.

are most often unknown, and, consequently, decisions are made according to the designer's "gut feeling."

Almost every aspect and property of a call flow can be considered a variable; for example, prompt wording, dialog direction type (open, directed, or mixed), order of questions asked and/or actions taken, speech recognition thresholds (sensitivity, confirmation, rejection), etc. The question arises: What should the values of these variables be set to? The general approach—and the only feasible one for designers of complex commercial applications that require quick deployment schedules—is to set most of the variables based on the interaction designer's gut feeling, past experience, "best practices" (i.e. strategies said to work best by experts), or sometimes even random whim. Some examples of such choices are:

The prompt is not to read "sorry, just say yes or no" because this sounds too apologetic.
The directed dialog will not have more than five choices because cognitive science suggests that human memory cannot hold more than that many informational items.
Ask first for the travel date and then for the departure location.
Lower the weight of the operator grammar rule because otherwise noise is too often falsely accepted as operator.
Set the sensitivity to 0.6, the time-out to 4 s, the rejection threshold to 0.2 and the confirmation threshold to 0.7.

A decision module provisionally implements a number of competing paths in a spoken dialog system for testing. In one embodiment, a decision module is implemented by randomly routing certain portions of traffic to individual paths and computing reward probability density functions for each of the routes or paths, and estimating the probability that a route will be the actual best performer. When the probability of a certain route exceeds a certain threshold (e.g. 0.95), this route is regarded as the statistically significant winner.

From a designer's point of view, a decision module is an activity in the call flow that has one incoming transition or path and several outgoing transitions or paths leading to the set of competitors, or strategies, for a specific decision module design. In one embodiment, the decision of which competitor to take at runtime is made by a random generator that uses a set of weights influencing how much traffic is routed to each of the competitors (usually, the initial weights are all equal). Hence, under the decision module design paradigm the process comprises: designing a plurality of choices and implementing all choices, and determining the best choice by implementing a probability estimator that includes a reward function.

Conservatively, one would collect as many data points as necessary to determine the statistically significant winner of a decision module instance. Depending on how much traffic the path receives as well as how different the performance of the competitors is, this collection could take a very long time. For instance, in Example 2, even after collecting data for more than half a year, a final decision could not be made.

Accordingly, disclosed is an embodiment for dynamically adjusting the weights influencing the load on every competitor according to the probability p that the respective competitor is the actual winner based on the observations collected so far, in contrast to waiting until statistical significance is found. In one embodiment, at run time, a decision module activity will randomly decide which alternative path to take. The random decision can be based on a set of randomization weights that make sure that, on average, a predefined amount of call traffic is routed to a given alternative. This weighting, among other things, allows for optimizing the cumulative performance of the application
allows a certain alternative to be preferred right at the beginning of the experiment since it is expected to outperform the others, and
allows for the exploration of the performance of an alternative even when it has been found to underperform (since, sometimes, the performance of alternatives can considerably change after certain events, as shown below in Example 1).

Described is the reward function and the mathematical foundations therefore by which decision events are evaluated under the heading Reward Function. Then, examples of decision module configurations as well as the applications they were implemented in are described, and findings therefore.

Reward Function

The performance of commercial spoken dialog systems can be expressed in many ways, though two of the most common metrics comprise:

1. Automation rate A (also referred to as task completion rate)
2. Average handling time T Both metrics have a direct impact on the application's bottom line, where the application is a spoken dialog system deployed to reduce costs incurred by employing human agents. The higher the automation rate, the higher the savings to the customer and the lower the handling time, the lower the expenses (e.g. hosting costs). These metrics are so often used because they can be calculated without human intervention by directly measuring the call outcome and call duration. It is also generally believed that these metrics correlate with user experience in that users generally prefer to complete a task and to do it in as short a time as possible. In order to evaluate the performance of our call flows, described is a reward function R that combines both automation rate and average handling time with a trade-off rate TA, described below. The value of the trade-off rate is arrived at on a customer-by-customer basis depending on the perceived relative importance of automation rate versus handling time. Explicitly, the reward function is:

$$R = A - \frac{T}{T_A}.$$

The foundations for the Reward Function are as follows.

The main argument for using commercial spoken dialog systems is to replace the human agent role in a telephone conversation in order to save costs. Other arguments such as consistency of performance or ease of scalability can also be mapped to cost savings. This is since call center agents can be extensively, consistently, and persistently trained (which is expensive), and a good number of agents could be kept on-call to account for unexpected peek situations like during outages (which is also expensive).

Every successfully automated call prevented a human agent to handle the same call, so, there is a (potentially call-type-dependent) saving amount associated with this call. This amount $W_A$ can be estimated based on statistics drawn from call center transactions. On the other hand, automated calls produce costs such as hosting, licensing, or telephony fees which depend on the duration of the call T. The per-time-unit cost $W_T$ can be calculated considering the former (and other) factors. Formally, the savings for a call are $$S = W_A A - W_T T. \quad (1)$$

Here, the flag $A \in \{0, 1\}$ determines whether the call was automated or not. For the sake of simplicity, regard $W_A$ and $W_T$ as call-independent constants in the following, so, for a set of calls 1, . . . N with the respective automation flags $A_1, \ldots A_N$ and the durations $T_1, \ldots, T_N$, the average savings can be estimated as $$\bar{S} = \frac{1}{N} \sum_{n=1}^{N} W_A A_n - W_T T_n. \quad (2)$$

Any optimization technique implemented may have an impact on the individual call's automation flags or durations, so, in fact, they are variables depending on the system in use. Without loss of generality, the system in use can be described by a system parameter vector describing one particular system out of the set of all possible systems. Now, to optimize a spoken dialog system is to use that parameter vector $\xi \in \Xi$ yielding the maximum average savings $$\hat{\xi} = \underset{\xi \in \Xi}{\operatorname{argmax}} \frac{1}{N} \sum_{n=1}^{N} W_A A_n(\xi) - W_T T_n(\xi) \quad (3)$$

$$= \underset{\xi \in \Xi}{\operatorname{argmax}} \sum_{n=1}^{N} T_A A_n(\xi) - T_n(\xi)$$

with $$T_A = \frac{W_A}{W_T},$$

a parameter describing the trade-off between savings induced by automation and costs induced by duration. Its unit is in time domain, and it can be interpreted as the duration of an automated call for which savings and costs are en par. As example, consider that a human operator costs 12.50 US$ for successfully handling a certain type of call. Further assume the software-as-a-service vendor of the spoken dialog system charges 15 US cents per minute for an automated call of the same type. $T_A = 5,000$ s is calculated for this scenario.

Returning to the reward function, Equation 3 demonstrates that the reward can also be expressed in terms of agent time saved by the application:

$$R = T_A A - T. \quad (4)$$

In contrast to Equation 1, this representation avoids speaking in currency units.

The optimization of commercial spoken dialog systems is based on the notion of a reward function. With respect to making optimal decisions among competing systems, Equation 3 is mathematically somewhat imprecise in that (1) there may not be equally many samples (N) drawn for each system (2) the average savings for a system $\xi$ may not be statistically stable enough to make a hard decision on what the best system is.

A decision module and technique can be implemented "live" and relies on splitting traffic among multiple systems with strongly varying degrees, so, N highly depends on the system. Moreover, it is possible that $N(\xi)$ is very small such that the arg max operation of Equation 3 becomes unreliable. Accordingly, the decision module allows for hard decisions to be replaced by probability-based soft decisions as is described below.

In one embodiment, a certain amount of traffic is routed to each of the competing alternative paths of the decision modules by randomly choosing one of them in every call and then measure the average reward for each path by looking at data. The invasiveness of this approach can be reduced by lowering the amount of traffic hitting certain paths expected to be underperforming. Generally, the randomizer that decides which of the alternative competing paths gets a given call, uses a set of weights to decide how much traffic to route to which competing path. When these weights are real-valued non-negative numbers summing up to one, then each of them can be interpreted as the probability with which the respective decision module path is chosen. The expectation is that the respective decision is probably the winner, taking all available statistical information into account. E.g., when there were two paths A and B, and the data shows that A is the winner with a 80% chance, 80% of the traffic should be routed to A. While collecting more and more data, the probabilities keep changing, and the traffic hitting each path keeps changing accordingly, until, at some point in time, the probabilities converge, and a definitive winner is found.

The estimation of the decision module probabilities can be based on statistical tests such as t and z tests for two-way decision module splits.

Here, the probability of a competitor being the winner is the p value of observing a value for the test statistic that, assuming the null hypothesis being true, is at least as extreme as the value that was actually observed. Consequently, statistical significance of the decision module approach is inherent to the probability estimation. A competitor is significantly underperforming when its probability falls under, say, 1%, i.e., a p value of 0.01. In case of an n-way decision module split, the numeric solution of n-dimensional integrals over the probability distributions of each of the competitors is required.

There can be two ways of implementing the decision module probability estimator. The probability weights can be calculated as described above and be static to a given decision module split. On the other hand, the probability may depend on run-time variables such as the identity of the caller, the season, day of the week, or time of the say, the response to questions in the history of the call, or even acoustic parameters indicating a certain caller behavior.

Thus the decision module and technique can provisionally implement a number of competing paths in a commercial spoken dialog system. By randomly routing certain portions of traffic to individual paths and computing average rewards for each of the routes, the goal is to find out which one performs best.

Next is disclosed a way to address and do away with common uncertainties on how to set up decision module weights, how much data needs to be accumulated to draw reliable conclusions, and how this relates to the notion of statistical significance.

In Example 1 below is a cable TV troubleshooting application for replacing human agents in certain situations. The original application performed an automated reboot of a dysfunctional cable box first, and, in case this did not fix the problem, it instructed the caller how to do a manual reboot. At some point, the manager of the call center deploying this application suggested to reverse the reboot order, i.e., first manual, then automatic, as this was the order the center's human operators employed, and the manager was convinced this was the optimal order.

Traditionally, and depending on the position of the requesting party, such requests are implemented without further questioning. In a post-mortem analysis, the performance impact of the change may be measured to prove (or possibly disprove) the initiator's arguments. However, in doing so, it happens often enough that a number of disparate performance metrics are consulted until one proving the initial argument is found. E.g., in the above example, the original implementation may have resulted in a higher automation rate than the new one, whereas the latter produced lower average handling times. However, automation rate and average handling time are oppositional metrics, since failed automation often results in short calls, as opposed to automated calls often taking a considerably longer duration.

Also, a comparison of average performance under a performance metric before and after the fact may not be very reliable. This can be because of the time dependence of performance due to seasonal deviations and special events such as outages, promotions, technical changes, etc. For example, in the cable system described above and in Example 1, a recent change to the backend services of a certain application showed a performance gain of 1.5 percentage points, similar improvements had been reported during the summer season of previous years without any changes to the application at those times.

In one embodiment, simultaneous deployment of the two systems in comparison and the routing of reasonable portions of traffic to both of them are employed. Similarly, a single system can be deployed containing a splitting module that, for every call, randomly selects one of its outbound transitions (paths). Each of the paths leads to an implementation of one of the competing strategies. This approach overcomes the time dependence but comes along with some other questions. For example, after a couple of hours, results are normally not yet reliable, and one has to wait for a certain degree of statistical significance. So, when are results statistically significant? Different thresholds have been proffered, such as:

After two weeks.
After 10000 calls.
When the performance difference is at least 1%.

Even if one of the above answers is correct (which they are not for many possible scenarios), there are other questions not yet answered such as:

How do these answers vary for decision modules with more than two paths?
Is it possible to vary the amount of traffic going down the path prior to achieving the required statistical significance in an attempt to optimize the gross average performance of the deployment including the decision module stage?

The above questions are addressed in a mathematically sound fashion below. The reward function allows for a decision module analysis to take place. Statistical significance in a decision module scenario is addressed under "Statistical Significance." The impact of a dynamic adjustment of the traffic going down decision module paths follows under "Adjusting the Traffic."

Statistical Significance

To avoid situations where constant arguments about the performance metric to be used prevent a decision module experiment from being conclusive, all involved parties agree on a single scalar metric for all the further considerations. A typical scalar performance metric is the fact whether a call was automated (A=1) or not (A=0). This type of scalar performance metric is also referred to as reward as done in many reference publications on machine learning of dialog management strategies as well as reinforcement learning. Hence, in order to express a call's performance solely based on whether it was automated or not, the reward function is $$R=A. \qquad (1)$$

A single raw metric such as whether a call was automated, the handling time, the number of operator requests, whether the caller hung up, or the number of recognition failures, to name only a few, is not exactly what the application analysis team was searching for. Rather, the actual reward function can be any type of combination between these metrics, e.g. a linear combination. If, for instance, only financial arguments are to be considered (principle (A) in the introduction), a derivation of a call's reward could read as follows:

Every automated call prevents a human operator from handling the call and consequently saves a certain average amount $R_A$.
On the other hand, every minute of running a spoken dialog system generates the cost $R_T$ for hosting and license fees, telephony, energy, hardware, maintenance, and so on.

For this simple derivation, the savings (or reward) R produced by a call with the duration T are $$R=R_A A - R_T T. \qquad (2)$$

To be able to estimate the statistical significance of results, a parameterized model of the probability density function of the reward, f(r) is described. First, however, is derived f for the simple case of the automation-dependent reward (see Equation 1 of the present section). Considering that there is an (unknown) probability $p_A:=p(A=1)$, it is established that a call will be automated, then R=1 with probability $p_A$ and R=0 with probability $1-p_A$. Consequently, the density function $$f(r;p_A)=(1-p_a)\delta(r)+p_a\delta(r-1). \quad (3)$$

is obtained.

Figure 6:
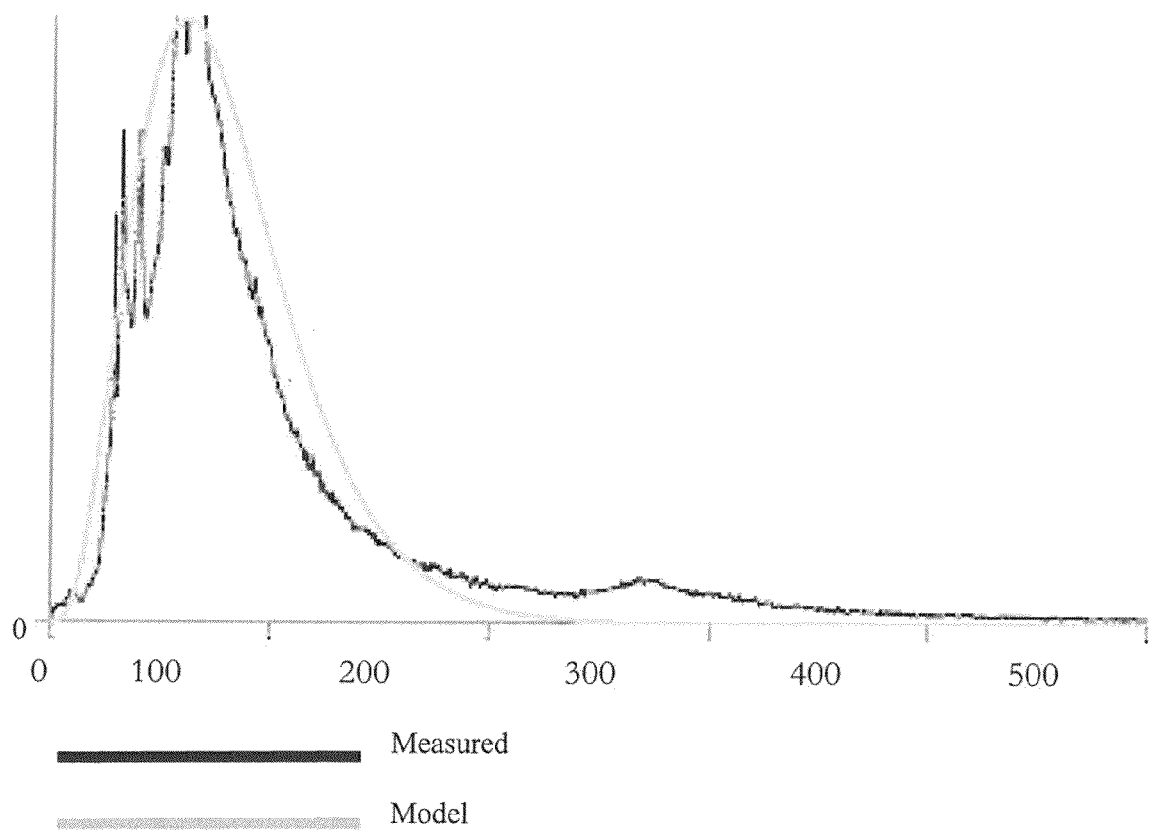
FIG. 6 shows a duration distribution of non-automated calls to recent calls.

Next, model f for the case of the financial reward function (Equation 2). First, model the probability density of the call duration for both automated and non-automated calls. A Gamma distribution is used as a probability model for handling times. It is defined as [6]

$$g(t;\alpha,\beta) = \begin{cases} \dfrac{\beta^\alpha}{\Gamma(\alpha)}t^{\alpha-1}e^{-\beta t} : t > 0 \\ 0 : \text{otherwise} \end{cases} \quad (4)$$

with the two parameters α (shape parameter) and β (rate parameter). Since t is a time variable, β has the unit $s^{-1}$, as does g. FIG. 6 shows a duration distribution of non-automated calls to the example cable TV troubleshooting system measured on the most recent 622,900 calls handled. It also shows the best-fitting Gamma distribution according to the least squares method.

In order to derive the density function for the reward function as a whole, consider
- The probability of automation pa, and
- the fact that the distribution parameters can strongly vary between automated and non-automated calls; so distinguish between αA, βA and αN, βN.

This results in five free parameters altogether and a combined bivariate density function.

1. When does a Decision Module not Use Common Statistical Hypothesis Tests?

Once an application including a decision module goes into production, traffic is routed down all the decision module paths. Each of the processed calls is associated with one of the I paths as well as certain reward observations:

$$R^i=\{r_1^i,r_2^i,\ldots\} \text{ for } i\in\{1,\ldots,I\}. \quad (6)$$

Now, rather than computing the average performance for all elements of $R^i$ to determine the winning path, an approach is followed whereby an estimate how likely it is that path i is the actual best-performing path is made. This approach follows the principles of statistical hypothesis testing [7] in that it aims at estimating probabilities for certain hypotheses. However, after exploring the properties of common test statistics such as t- or z-test, it turns out there are several reasons they cannot apply in all embodiments:
- These statistics can only be applied when comparing exactly two competitors.
- Statistical tests involving more than two competitors such as ANOVA [8] or Tukey's test [9] compare all competitors in a pair-wise fashion to find out which ones significantly differ from one another. This is again not applicable to a scenario which is to determine a single probability for a given competitor to be the winner.
- The test statistics are imprecise due to certain assumptions such as that
    - the reward follows a univariate normal distribution,
    - that there is a minimum number of samples per path,
    - that the variations of the compared univariate normal distributions are either known or equal each other.

2. Estimating Winning Probabilities

Taking all common test statistics aside, the winning probability of a decision module path using raw mathematical means and knowledge about the reward density is undertaken. To begin, look at a single decision module path and assume knowledge of its optimal parameterization a which is the set of all parameters of the reward function model. The respective probability density for a single observed call is f(r;a). If exactly two calls resulting in the reward set R={r1, r2} were processed, there were two orders in which these events could have happened, and the probability density combination would have been $$f(r_1,r_2;a)=2f(r_1;a)f(r_2;a). \quad (7)$$

Which can be generally written as $$f(R;a) = c\prod_{r\in R} f(r;a) \quad (8)$$

with the normalization constant c. Now, it is time to get a second decision module path into play. Using the above derivations, determine how likely it is that the expected reward of Path 1 given its observation set $R^1$ is greater than that of Path 2 given $R^2$. In doing so, consider (i.e. integrate over) all possible model parameterizations for both paths all of which could potentially have produced $R^1$ and $R^2$:

$$p(r_1 > r_2; R^1, R^2) = \int_{a^1} f(R^1;a^1)\int_{a^2} f(R^2;a^2)\varepsilon(a^1,a^2)da^1 da^2 \quad (9)$$

with $$\varepsilon(a^1,a^2) = \begin{cases} 1 : E(r;a^1) > E(r;a^2) \\ 0 : \text{otherwise} \end{cases} \quad (10)$$

where E(r; a) refers to the expected value of r given the model a. To know $p(r_1>r_2)$ in a two-path decision module, directly leads to the winning probabilities $$p(1)=p(r_1>r_2) \text{ and } p(2)=1-p(r_1>r_2). \quad (11)$$

In order to extend this derivation to multiple paths, the fact that a decision module winner i is supposed to outperform all other competitors j;j≠i is used. In the list of all I! possible performance rankings, there are (I−1)! rankings with i at the top. E.g., given a four-path decision module, there are (4−1)!=6 scenarios for path 3 to be the winner

```
3 1 2 4
3 1 4 2
3 2 1 4
3 2 4 1
3 4 1 2
3 4 2 1.
```

The probabilities for all these scenarios have to be summed up to yield ith winning probability $$p(i) = p(r_i > r_1 > r_2 > \ldots > r_{l-1} > r_l) \quad (12)$$
$$+ p(r_i > r_1 > r_2 > \ldots > r_l > r_{l-1})$$
$$\vdots$$
$$+ p(r_i > r_l > r_{l-1} > \ldots > r_2 > r_1)$$

where the individual addends can be calculated via an extension of Equation 9:

$$p(r_i > r_j > \ldots > r_k; R^1, \ldots, R^l) = \int_{a^i} f(R^i; a^i) \int_{a^j} f(R^j; a^j) \ldots \quad (13)$$
$$\int_{a^k} f(R^k; a^k) \varepsilon(a^i, a^j, \ldots, a^k) da^i da^j \ldots da^k;$$
$$\varepsilon(a^i, a^j, \ldots, a^k) = \begin{cases} 1 : E(r; a^i) > E(r; a^j) > \ldots > E(r; a^k) \\ 0 : \text{otherwise} \end{cases}$$

3. A 3-Path Decision Module

While the above formula apparatus may seem overly complex and probably gives a slight flavor of intractability, computational complexity is generally not a problem here. This is mainly because of the very limited number of decision module paths in most commercial deployments rarely exceeding five or so. Furthermore, calculation complexity can be largely reduced by using simple reward functions such as the automation-based one (see Equation 1). To prove this point, consider a 3-path decision module and quickly reiterate over all the steps explained in 2. Estimating winning probabilities above. To get started, it should be pointed out that there is a single parameter $a=p_A$ per path in the automation reward scenario and that the reward set is composed of only two possible values, 0 and 1. Therefore, a reward set R can be represented by the counts of ones ($c_1$ and zeros $c_0$). Using Equation 3 for the specific density function, and understanding that the expected reward is equivalent to the actual probability of being automated, $E(r; p_A)=p_A$ allows Equation 8 to be rewritten as $$f(R; p_A) = c \cdot \prod_{r \in R} \cdot f(r; p_A) \quad (14)$$
$$= c \cdot (f(1; p_A))^{c_1} \cdot (f(0; p_A))^{c_0}$$
$$= \binom{c_1 + c_0}{c_1} (p_A)^{c_1} (1 - p_A)^{c_0}.$$

The next step is to insert the result into Equation 13

$$p(r_i > r_j > r_k; c_1^i, c_0^i, c_1^j, c_0^j, c_1^k, c_0^k) = \binom{c_1^i + c_0^i}{c_1^i} \binom{c_1^j + c_0^j}{c_1^j} \binom{c_1^k + c_0^k}{c_1^k}. \quad (15)$$
$$\int_0^1 x^{c_1^i}(1-x)^{c_0^i} \int_0^x y^{c_1^j}(1-y)^{c_0^j} \int_0^y z^{c_1^k}(1-z)^{c_0^k} dz\, dy\, dx.$$

Finally, the three winning probabilities are obtained using Equation 12 (and discarding the parameter arguments):

$$p(1)=p(r1>r2>r3)+p(r1>r3>r2),$$
$$p(2)=p(r2>r1>r3)+p(r2>r3>r1),$$
$$p(3)=p(r3>r1>r2)+p(r3>r2>r1). \quad (16)$$

Adjusting the Traffic

Having now learned how to determine the winning probability of a path, the question arises on how these findings are to be translated into actions and when to do so. For example, does a winning probability of 1% mean one should remove the path from the decision module? Or 5%, or 10%? What if there were 10 paths each of which has a 10% winning probability? What should one do when the progress is extremely slow? 60% probability after one week, 70% after three weeks, 80% after two months? In explaining why does the decision module not use common statistical hypothesis tests, an analysis method was introduced as a statistical hypothesis test similar to established ones such as t- or z-tests. Those use a p-value and an associated significance level to determine whether a difference is assumed to be statistically different. Common significance levels are 5%, 1%, and 0.1%, so similar levels could also be assumed in the present test. However, the argument made above that, the more paths are involved, the lesser the individual probabilities become, indicates that the significance level should be sufficiently small for the task in question.

Accordingly, disclosed is an approach for embodiments to adjust path traffic in a continuous fashion using the winning probabilities themselves as weights. That is, when a path shows a 90% probability to be the winner, 90% of traffic is routed down this path.

Three different approaches are compared to assess the gross average reward:

(1) Randomly choosing a winner.
(2) Chose a winner once its winning probability is above a certain threshold.
(3) Dynamically adjust traffic based on winning probabilities.

Before starting, the agreed upon standards are set forth:
If the decision module winner were known from the very beginning, the actual infinite-horizon reward of the best performing path could be achieved.
Without loss of generality, the focus is on a two-path decision module.
Let $\Delta$ be the (positive) performance difference between the actual infinite-horizon rewards of the decision module paths.
The decision module deployment starts at time t0.

Starting with (1), randomly choosing a winner, if Path 1 is randomly chosen to be the winner it will be optimal ($r=\hat{r}$) with probability p and sub-optimal (($r=\hat{r})-\Delta$) with 1−p. So, the expected reward at time t0 is $$E_1(r, t_0) = \hat{r} p + (\hat{r} - \Delta)(1 - p) \quad (17)$$
$$= \hat{r} - \Delta + \Delta p.$$

Analogously, routing all traffic down Path 2 would result in $$E_2(r, t_0) = \hat{r}(1 - p) + (\hat{r} - \Delta)p \quad (18)$$
$$= \hat{r} - \Delta p.$$

When the decision to route down a certain path is made completely randomly, then p=0.5 and, consequently, $$E_1(r, t_0)=E_2(r, t_0)=\hat{r}-0.5\Delta. \quad (19)$$

Next, Option (2) is explored. Instead of routing random traffic to both paths for the entire time of the deployment, this is only done upon achievement of a probability update at time t1 of $$p(t_0)=p(t_0)+\Delta_p. \quad (20)$$

If $\Delta p > 0$, a hard decision to route all traffic to Path 1 can be made:

$$E_1(r, t_1) = \hat{r} - \Delta + \Delta(p + \Delta_p) \quad (21)$$
$$= \hat{r} - 0.5\Delta + \Delta_p\Delta > E_1(r, t_0).$$

Otherwise, traffic is routed to Path 2:

$$E_2(r, t_1) = \hat{r} - \Delta(p + \Delta_p) \quad (22)$$
$$= \hat{r} - 0.5\Delta - \Delta_p\Delta > E_2(r, t_0).$$

Thus, routing the full traffic to the most probably winning path after waiting until t1 (2) outperforms the purely random choice (1).

Finally, Option (3) is compared. Revisiting (2) for a moment, a typical approach would be to leave 50% traffic on both paths until, at a time t1, a certain statistical significance was found (e.g., p<5% or p>95%) and then to route full traffic to the probable winner. Assume the winning probability is analyzed at a time t' with t0<t'<t1 and find, similar to Equation 20, $$p(t')=p(t_0)+\Delta_p. \quad (23)$$

As opposed to the above example, this time, make a soft decision by routing p(t') traffic to the respective path. If $\Delta_p > 0$ the updated expected reward becomes:

$$E_1(r, t') = (0.5 + \Delta_p)(\hat{r} - 0.5\Delta + \Delta_p\Delta) + \quad (24)$$
$$(0.5 - \Delta_p)(\hat{r} - 0.5\Delta - \Delta_p\Delta)$$
$$= \hat{r} - 0.5\Delta + 2\Delta_p^2\Delta > E_1(r, t_0).$$

The equivalent can be shown for $\Delta_p < 0$. This proves that an update according to the winning probability is beneficial for the gross reward of an application.

EXAMPLES

Example 1

In a first example, three decision modules are applied to a cable television troubleshooting application, one four-way split and two two-way splits. Table 1 contains the experimental properties. As the experiment was based on less than 40,000 calls, with a single exception, none of the decision modules was found to perform statistically significantly worse than its competitors. Only one decision module of the four-way split resulted in a probability of less than 1%. Despite this lack of data to make final decisions, the adapted probabilities resulted in an overall performance gain of ΔR=29.4 s (for the underlying reward function, see Equation 4) as compared to the baseline system which used equiprobable decision modules.

TABLE 1

| Corpus statistics decision module experiment | |
|---|---|
| #calls (tokens) | 38.004 |
| $T_A$ | 5.000 s |
| R baseline | 253.4 s |
| R after contending | 282.9 s |
| ΔR | 29.4 s |

Example 2

System and Decision Modules

Seven decision modules were implemented in five commercial spoken dialog systems that processed 2.9 million calls. A brief overview of the decision modules and systems evaluated is given, followed by a presentation of data facts and results.

1. Cable TV Troubleshooting, Provider X

Three decision modules were put into production at one of the call centers of a cable TV provider. The dialog system in question is a TV troubleshooting system able to remotely reset cable boxes, help with bad picture quality or no picture at all, poor audio quality, the channel guide, the remote control, error messages, as well as other technical problems.

C1. Call-reason disambiguation. Compare different strategies (open-ended prompt, yes/no question, directed menu) for collecting the technical problem the users are having with their cable TV.
  C1a. Please tell me the problem you are having in one short sentence.
  C1b. Are you calling because you've lost some or all of your cable TV service? followed by C1a) if the answer was 'no'.
  C1c. C1a+or you can say 'what are my choices' followed by a back-up menu if the answer was 'choices'.
  C1d. C1b followed by C1c if the answer was 'no'.
C2. Box unplugging instructions. Explore the impact of different troubleshooting techniques w.r.t. unplugging a cable box.
  C2a. The caller is asked to unplug the cable from the back of the cable box.
  C2b. The caller is asked to unplug the cable from the back of the cable box or, alternatively, from the wall.
C3. Box reboot. Explore the impact of manual or automatic cable box rebooting.
  C3a. The system performs an automated cable box reboot. If it fails the caller is asked whether he or she feels comfortable doing a manual reboot. If the answer is 'no' then the caller is escalated to a human.
  C3b. The system asks whether the caller feels comfortable doing a manual reboot. If he or she says 'no' the system performs an automated reboot.

2. Cable TV Troubleshooting, Provider Y

The TV troubleshooting system of a second cable provider with very similar capabilities as the one described above.

C4. Opt-in. Explore the effect of phrasing differences in persuading the user to engage with the automated system (also referred to as opting-in).
  C4a. To begin troubleshooting with me, the automated agent, say 'let's start now'. [2 sec pause] Otherwise, you can say 'representative'.
  C4b. To get started, say 'continue'. [2 sec pause] If at anytime you'd like to troubleshoot with a customer service representative, just say 'agent'.

3. Cable TV Troubleshooting, Provider Z

The TV troubleshooting system of yet another cable provider, again with very similar capabilities as the one described in 1.

C5. No-picture troubleshooting order. Explore switching the order of troubleshooting steps.
  C5a. First have the caller reboot the cable box. If this does not help then ask the caller to verify that the input source is correctly set.
  C5b. First verify that the input source is correctly set. If this does not help, reboot the cable box.

4. Internet Troubleshooting

The Internet troubleshooting spoken dialog system can help callers resolve lost, slow, and intermittent Internet connections; fix e-mail sending and receiving problems; set up a new account, regulate parental controls, fix a missing dial tone for Voice-over-IP telephones, and the like.

C6. No-dial-tone troubleshooting. Try brute-force modem reboot versus a strategy that reboots only when necessary.
  C6a. Reboot the modem.
  C6b. First check the modem light pattern. If it indicates that a modem reboot would resolve the issue, reboot, otherwise, escalate the caller to a human.

5. Voice-Over-IP FAQ

The Voice-over-IP application provides answers to frequently asked questions concerning the digital phone service of a provider. Possible questions concern voicemail setup and usage, features such as call blocking, conference calls, call forwarding, or no-dial-tone troubleshooting.

C7. Call reason disambiguation. Compare different strategies (open-ended prompt versus directed menu) for collecting the calling feature of interest to the caller.
  C7a. Briefly tell me what you're calling about today.
  C7b. There are quite a few things I can help you with. To start, just say 'voicemail' or 'calling features'. Or you can say 'help me with something else'. Other disambiguation menus follow.

Data and Results

Statistics on the results of the seven aforementioned decision module experiments are described below.

TA The trade-off parameter, where TA→0 means that average handling time is considered most important and TA→∞ means that automation rate is most important. TA is set in accordance with the customer's or account management's preference.

time A number of days that a decision module has been in production.

nTotal The total number of calls that an application with a decision module processed in a given time interval.

nContender The number of calls hitting a decision module. Depending on the location of the decision module in the call flow, it will get hit more or less frequently. For example, call-reason disambiguation is usually hit by most calls, whereas no-dial-tone troubleshooting accounts for only a small percentage of Internet calls.

Table 2 shows these statistics for all decision modules introduced above in three to seven months of deployment.

TABLE 2

Decision Module statistics

| Decision | TA | time | nTotal | nContender | R | p |
|---|---|---|---|---|---|---|
| C1 | 7166 | 223 | 313,210 | 298,098 (95.2%) | (0.058, 0.064, 0.056, 0.060) | (0, 1, 0, 0) |
| C2 | 7166 | 223 | 313,210 | 43,130 (13.8%) | (0.222, 0.219) | (0.77, 0.23) |
| C3 | 7166 | 223 | 313,210 | 139,937 (44.7%) | (0.104, 0.116) | (0, 1) |
| C4 | 00 | 139 | 1,584,875 | 888,240 (56.0%) | (0.217, 0.211) | (1, 0) |
| C5 | 5000 | 98 | 497,923 | 51,562 (10.4%) | (0.331, 0.335) | (0.21, 0.79) |
| C6 | 5000 | 100 | 459,642 | 18,913 (4.1%) | (0.264, 0.206) | (1, 0) |
| C7 | 00 | 197 | 49,961 | 47,909 (95.9%) | (0.237, 0.233) | (0.79, 0.21) |

Table 2 also shows the competitors' average rewards per decision module (R) as well as the winning probabilities of the respective competitors (p). The order of the components of R and p is as introduced above. E.g., for Decision C6, read $(R_{C6a}, R_{C6b}) = (0.264, 0.206)$ and $(p_{C6a}, p_{C6b}) = (1, 0)$ as the reward of C6a is 0.264 and the reward of C6b is 0.206, and the probability that C6a performs significantly better than C6b is 1.0.

Generally, it can be see seen that among the implemented decision modules, there are some statistically significant winners (C1, C3, C4, and C6) and some that still await a final decision (C2, C5, C7). In accordance with the usual practice in statistical hypothesis testing which is the foundation of the mathematical model underlying the estimation of p, statistical significance is achieved when the winning probability exceeds 0.95. As discussed above under Reward Function, the fact that a statistically significant reward difference is found does not solely depend on the sheer amount of data collected (C6 is found to be significant with less than 19,000 calls, whereas C5 is still pending a decision with more than 50,000 calls). Another factor is the actual difference in performance of the competitors. When this difference is slim, many data need to be collected before a clear winner can be identified.

Returning to the implemented decision modules of this example, observed results in the deployed systems are given.

C1. The winning competitor C1b contains a yes/no question followed by an open prompt if people respond 'no' to the former. However, in case they respond 'yes', which happens about half as often, the call reason is known, and the actual troubleshooting can begin. The fact that people call about loss of service far more often than about anything else makes a yes/no question upfront more effective than the other tested competitors.

C2. The reward difference of the competitors is so marginal (a difference of just 0.003) that a winner could not yet be determined. The alternative unplugging option (from the wall) does not seem to make much difference.

C3. Asking whether callers feel comfortable manually rebooting the cable box and acting according to their response with either manual or automatic reboot performs significantly better than a sequence of steps starting with the (often unsuccessful) automatic reboot.

C4. Even though the competitors' reward difference is small (0.006), a definite winner emerges due to the substantial amount of collected data (almost 900,000 calls).

C5. Not much difference is shown between first rebooting the cable box and then checking the input source, or vice versa. At this stage, more data has to be accumulated to determine the optimum strategy.

C6. In this case, brute force application of modem reboot outperforms an attempt at a targeted approach. The result confirms a general assumption that a flow that actively escalates callers will not perform better than a flow that does not actively escalate callers when automation rate is part of the reward function.

C7. In the course of the 197 days this decision module received live traffic at some point competitor C7a significantly outperformed C7b (i.e., $(p_{C7a}, p_{C7b})=(1,0)$). According to the paradigm explained in above, 100% traffic was routed to competitor C7a at the start. Later, however, the performance of the application started declining. At this time, though, no data were being accumulated for C7b since it was found to perform significantly worse that C7a. Due to the drop in performance of C7a, a built-in re-adjustment mechanism started routing more traffic to the C7a option so that an updated comparison could be made. As shown in Example 3 below, after collecting a sufficient amount of new C7b data, the continuous analysis will be able to conclude whether C7a is still winner or whether C7b is taking over. In this sense, decision module acts in a self-healing mode and is able to react to dynamically changing situations.

Example 3

Example 3 describes large-scale implementations of 26 decision modules in 10 commercial spoken dialog systems, including those of Example 1 above, that processed about 15 million calls. A brief overview of the decision modules and systems evaluated is given, followed by a presentation of data facts and results.

Systems and Decision Modules

This section briefly describes dialog systems and decision modules analyzed. All the considered systems provide either technical support or FAQs for customers of cable companies. Some of the decision modules were implemented in different applications. Since the behavior of a decision module can differ considerably depending on the specific customer (as exemplified in the Data and Results Section below), results are distinguished by customer ID (A through E).

1. Cable TV Troubleshooting

The cable TV troubleshooting application helps callers to resolve problems related to missing or bad picture, audio quality, remote control, channel guide, and can also refresh cable boxes.

C1. Cable box reboot order (Customers A, B)
   a. The system performs an automated reboot. If it fails, callers are asked whether they feel comfortable performing a manual reboot. If the response is 'no' they get escalated to a human agent.
   b. Callers are asked whether they feel comfortable doing a manual reboot. If they respond 'no', an automated reboot is performed.

C2. Cable box unplugging instructions (Customer A)
   a. Callers are asked to unplug their cable from the back of the box.
   b. Callers are asked to unplug their cable from the back of the box or, alternatively, from the wall.

C3. Problem capture (Customer A)
   a. Please tell me the problem you are having in a short sentence.
   b. Are you calling because you lost some or all of your cable TV service? followed by a) if the answer was 'no'.
   c. a)+or you can say 'what are my choices' followed by a back-up menu if the answer was 'choices'.
   d. b) followed by c) if the answer was 'no'.

C4. Input source troubleshooting (Customer B)
   a. Perform a box reboot. If it fails let the caller check whether the input source on their television is correctly set.
   b. First check for the correct input source. If it fails, perform a reboot.

C5. Outage prediction when caller has no picture (Provider B)
   a. Ask whether the problem is happening on all of the caller's multiple TVs. If the answer is 'yes' the system assumes there is an outage and escalates the call to a human agent. Otherwise, perform a box reboot.
   b. Perform a box reboot.

C6. Phrasing of opt-in prompt (Customer C)
   a. To begin troubleshooting with me, say 'let's start now'. [2 sec pause] Otherwise, you can say 'representative'.
   b. To get started, say 'continue'. [2 sec pause] If at anytime you'd like to troubleshoot with a customer service representative, just say 'agent'.

2. Internet Troubleshooting

The Internet troubleshooting application addresses lost, slow, or intermittent Internet connections, e-mail issues, parental control settings, etc., and can also fix a missing dial tone on a Voiceover-IP phone.

C7. Order of lost Internet troubleshooting steps (Customers A, D)
   a. Reboot modem, router, and computer. Then check whether the caller's Internet came back.
   b. Reboot modem. Then check for success. If unsuccessful, reboot router and computer and then check again.
   c. First check the modem light pattern. Only when the pattern suggests that a reboot would resolve the problem, reboot, otherwise, escalate the call to a human agent.

C8. Order of troubleshooting steps, no lights (Customers A, D, E)

The same as C7 but without Alternative c—for modems whose light patterns are not yet being researched.

C9. No-dial-tone troubleshooting of Internet modem (Provider D)
   a. Reboot the modem.
   b. First check the modem light pattern. Only when the pattern suggests that a reboot would resolve the problem, reboot, otherwise, escalate the call to a human agent.

C10. Account lookup (Customer D)
   a. When the system knows the caller ID, it plays the message one moment while I look up your account information and then performs an account lookup before it goes into troubleshooting. If the caller ID is unknown, account lookup and message are skipped.
   b. The system plays the message regardless of whether the caller ID is known and regardless of whether an account lookup is actually going to occur.

C11. Computer reboot instructions (Customers A, C, D, E)
   a. While your modem's getting a fresh signal, we need to shut down the main part of your computer; you can leave your monitor on.
   b. While your modem's getting a fresh signal, we need to shut down your computer.

C12. Operating system capture (Customers A, B, C, D, E)
   a. Are you running Windows or Macintosh?
   b. Are you running Windows?

3. Voice-Over-IP FAQ

Our Voice-over-IP application answers questions about phone features such as voice mail, caller ID, call blocking, conference calls, and call forwarding.

C13. Call reason capture (Customer D)
  a. Briefly tell me what you're calling about today.
  b. There are quite a few things I can help you with. To start, just say 'voicemail' or 'calling features'. Or you can say 'help me with something else'.
C14. Caller ID disambiguation (Customer C)
  a. Do you want to block your ID or see who's calling? [pause] You can also say 'help me with something else'.
  b. If you want to block your ID so people can't see that it's you calling, say 'block my ID'. If you want to know who's calling before you pick up the phone, say 'see who's calling'.

Data and Results

As reward function, we are using Equation [0048] with the trade-off parameter of TA=5000 s. To facilitate interpretation of the experimental results displayed in Table 3, the following additional statistics are included:

time. This represents a given number of days the decision module was in production.

nTotal. The number of calls processed by the application featuring the respective decision module.

nContender. The number of calls processed by the respective decision module (depending on which part of the call flow the decision module is located in, this number is somewhere between 0 and nTotal).

p The probability that an alternative is the winner based on the data collected in the course of the experiment. This probability is estimated based on the principles explained in [17]. In Table 3, R and p are displayed for the decision module Alternatives a, b, etc. in the form $$(R_a, R_b, \ldots) \text{ and } (p_a, p_b, \ldots). \quad (2)$$

In the table, performance values of alternatives that were found to be statistically significantly different from competing alternatives are identified by printing their winning probabilities p in bold. A result is deemed statistically significant when p approaches either 0 or 1 with a significance level of 0.05. This means that if a decision module has two alternatives, both, $p_a$ and $p_b$ will be found either significant or not. When there are more than two alternatives, however, it is possible that the probabilities of some alternatives are found to be significant while others are not. E.g., Alternative c of C7A was found to significantly underperform while the contention between Alternatives a and b is not decided yet.

Whether alternatives are found to be statistically significant winners or losers depends on the observed performance differences and on the amount of data collected. E.g., C6 features a clear winner (Alternative b) even though its performance is only slightly higher than Alternative a (0.170 vs. 0.174), however, the sheer amount of data analyzed (almost 1.7 million calls) showed the result to be significant nonetheless. Also C12D has a clear winner (Alternative b) although only 1343 calls hit the decision module. Here, the performance difference was found to be substantial (0.150 vs. 0.214).

As shown in Table 3, in the present example the same decision module system was implemented in different customers' spoken dialog systems treating them as separate experiments.

TABLE 3 decision module statistics.

| Contender | Customer | time [d] | nTotal | nContender | | R | p |
|---|---|---|---|---|---|---|---|
| C1 | A | 376 | 644,819 | 281,897 | (44%) | (0.117, 0.110) | (1, 0) |
| | B | 153 | 613,007 | 240,380 | (39%) | (0.274, 0.273) | (0.74, 0.26) |
| C2 | A | 376 | 644,819 | 89,451 | (14%) | (0.229, 0.230) | (0.40, 0.60) |
| C3 | A | 376 | 644,819 | 615,162 | (95%) | (0.057, 0.062, 0.054, 0.057) | (0, 1, 0, 0) |
| C4 | B | 134 | 657,535 | 71,015 | (11%) | (0.331, 0.332) | (0.48, 0.52) |
| C5 | B | 153 | 613,007 | 76,634 | (13%) | (0.159, 0.309) | (0, 1) |
| C6 | C | 255 | 2,927,289 | 1,684,134 | (58%) | (0.170, 0.174) | (0, 1) |
| C7 | A | 287 | 2,302,878 | 193,589 | (8%) | (0.275, 0.279, 0.250) | (0.37, 0.63, 0) |
| | D | 267 | 1,176,073 | 126,714 | (11%) | (0.234, 0.238, 0.194) | (0.33, 0.67, 0) |
| C8 | A | 30 | 229,421 | 12,828 | (6%) | (0.251, 0.261) | (0.11, 0.89) |
| | D | 126 | 1,053,522 | 45,873 | (5%) | (0.310, 0.313) | (0.30, 0.70) |
| | E | 224 | 81,784 | 42,606 | (52%) | (0.352, 0.389) | (0.08, 0.92) |
| C9 | D | 255 | 1,176,073 | 26,316 | (2%) | (0.267, 0.204) | (1, 0) |
| C10 | D | 126 | 526,761 | 88,650 | (17%) | (0.158, 0.164) | (0.01, 0.99) |
| C11 | A | 30 | 229,421 | 24,654 | (11%) | (0.415, 0.406) | (0.86, 0.14) |
| | A' | 30 | 23,807 | 2,306 | (10%) | (0.407, 0.452) | (0.05, 0.95) |
| | C | 15 | 193,037 | 47,967 | (25%) | (0.212, 0.207) | (0.92, 0.08) |
| | D | 23 | 69,058 | 13,416 | (19%) | (0.406, 0.395) | (0.90, 0.10) |
| | E | 20 | 4,407 | 1,302 | (30%) | (0.389, 0.374) | (0.71, 0.29) |
| C12 | A | 30 | 229,421 | 6,384 | (3%) | (0.136, 0.130) | (0.69, 0.31) |
| | B | 90 | 90,070 | 3,920 | (4%) | (0.035, 0.028) | (0.69, 0.31) |
| | C | 15 | 193,037 | 5,781 | (3%) | (0.042, 0.025) | (0.94, 0.06) |
| | D | 23 | 69,058 | 1,343 | (2%) | (0.150, 0.214) | (0.01, 0.99) |
| | E | 20 | 4,407 | 283 | (6%) | (0.075, 0.070) | (0.54, 0.46) |
| C13 | D | 365 | 100,815 | 83,711 | (83%) | (0.193, 0.237) | (0.02, 0.98) |
| C14 | C | 15 | 4,958 | 210 | (4%) | (0.037, 0.024) | (0.67, 0.33) |

For example, C1 has shown significant results for Customer A while there is only a marginal performance difference for Customer B. In the case of C12, almost all customers (marginally) tend to Alternative a (A, B, C, and E), however, the only significant result is that of Customer D which clearly finds Alternative b to be the winner. Even more interesting, for C11, all participating customers (A, C, D, E) (marginally) tend towards Alternative a. When taking the data collected for Customer A and limiting the analysis to only one of the 16 call centers the customer operates, it is determined that, for this specific caller population, Alternative b significantly outperforms a (C11A).

The observation that results of decision module experimentation seem to (sometimes) depend on certain external parameters (the present example shows that one such parameter is the caller population), and hence it will be appreciated that other parameters (time of the day, day of the week, call reason, caller expertise, etc.) can influence optimal decisions of decision modules. For example, conclusions such as "b is the winner unless it is for Customer A or D or for Customer B's Call Center 13, however, only when it is a weekend and the callers are from Area Code 212 and have not called already during the last 48 hours . . . " are possible.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A dialog manager for a spoken dialog system comprising a computer, a processor, and memory, and comprising:
   a decision module for selecting a oath from a plurality of alternative paths for a given call, wherein each path implements one of a plurality of strategies for a call flow; and
   a weighting module for weighting the path selection decision, wherein the weighing module is operatively connected to a probability estimator for estimating a probability value that a given path of the plurality of paths is the hest-performing path;
   wherein the system is configured to direct incoming calls to each of the alternative paths selected by the decision module, and
   wherein the probability estimator includes a reward function R, and wherein the reward function R comprises the expression $$R = A - \frac{T}{T_A}$$

Wherein A is an automation rate, T is an average handling time, and $T_A$ is a trade-off rate for automation rate and average handling time.

2. The dialog manager of claim 1, wherein the probability estimator includes a parameterized model of the probability density function of the reward function.

3. The dialog manager of claim 1, wherein the probability estimator includes a dependent probability parameter.

4. The dialog manager of claim 3, wherein the probability estimator is configured to self-adjust based on the dependent probability parameter.

5. The dialog manager of claim 1, wherein the decision module selects a path based on a dependent probability parameter.

6. The dialog manager of claim 1, further comprising:
   a dynamic adjustment element configured to dynamically adjust the weights of the weighting module based on data indicating how likely each of the paths will be the best-performing path.

7. The dialog manager of claim 1, wherein the probability estimator is configured to the winner among two or more paths.

8. The dialog manager of claim 7, wherein the dialog manager is configured to distribute the calls among the pluralities of strategies in accord with the probability percentages estimated by the probability estimator, the dialog manager comprising:
   the decision module being configured to select the path from the plurality of alternative paths for each call, wherein the weighing module is configured to estimate the probability percentage for each path of the plurality of paths, and
   wherein the dialog manager is configured to direct each incoming call to a selected path such that the plurality of calls is distributed among alternative paths in accord with the probability percentages selected by the decision module.

9. The system of claim 1, wherein the decision module includes:
   a random generator for selecting a strategy from the plurality of strategies with the weighting of the weighting module.

10. The system of claim 1 wherein the probability estimator is remotely located from the weighting module.

11. A call flow method for a spoken dialog system comprising:
   selecting a subset of incoming calls for live implementation of alternate strategies for an activity of a call flow for a spoken dialog system;
   configuring a set of weights to determine how the calls will be distributed among the strategies, and
   distributing the calls among the strategies in accord with the weights,
   wherein the set of weights are distributed in accord with a probability value calculated using a reward function R, and wherein the reward function R comprises the expression $$R = A - \frac{T}{T_A}$$

Wherein A is an automation rate, T is an average handling time, and $T_A$ is a trade-off rate for automation rate and average handling time.

12. The method of claim 11 wherein the method further comprises:
   distributing calls among the strategies by winning probabilities.

13. The method of claim 11 wherein the method further comprises:
   dynamically adjusting the weights for distributing the calls based on actual performance of the strategies.

14. The method of claim 11 wherein the method further comprises:
   dynamically adjusting the weights for distributing the calls based on call parameter.

15. A call flow method for a spoken dialog system comprising a computer, a processor, and memory, comprising:
   configuring a plurality of competitor strategies for an activity of a call flow for a spoken dialog system;
   implementing the plurality of competitors for the activity in the spoken dialog system; and wherein the system is configured to select a strategy based on a reward function R, and wherein the reward function R comprises the expression $$R = A - \frac{T}{T_A}$$

Wherein A is an automation rate, T is an average handling time, and $T_A$ is a trade-off rate for automation rate and average handling time.

16. The method of claim 15, wherein the system is configured perform the method further comprising:
selecting a path from a plurality of alternative paths for a given call, wherein each path implements one of the plurality of competing strategies for the call flow.

17. The method of claim 16, wherein the system is configured perform the method further comprising:
weighting the path selection decision with weights including a probability value that a given path of the plurality of paths is the best-performing path; and
directing calls to each of the alternative paths in accord with the weights.

18. The method of claim 17, wherein the probability value is calculated as from the reward function.

19. The method of claim 18, wherein the probability value is calculated from a parameterized model of a probability density function of the reward function.

20. The method of claim 18, wherein the system is configured perform the method further comprising:
calculating the probability value from a dependent probability parameter.

21. The method of claim 20, wherein the wherein the system is configured perform the method further comprising:
automatically self-adjusting the probability value based on the dependent probability parameter.

22. The method of claim 20, wherein the system is configured perform the method further comprising:
selecting a strategy based on a dependent probability parameter.

23. The method of claim 17, wherein the system is configured perform the method further comprising:
dynamically adjusting the weights based on data indicating how likely each of the paths will be the best-performing path.

24. The method of claim 16 wherein the system is configured perform the method further comprising:
estimating a winner among two or more paths.

25. The method of claim 16, wherein the system is configured perform the method further comprising:
distributing the calls among the pluralities of strategies in accord with the probability values;
selecting the path from the plurality of alternative paths for each call, wherein the weights are estimated from a probability percentage for each path of the plurality of paths, and
directing each incoming call to a selected path such that the plurality of calls is distributed among alternative paths in accord with the probability percentages.

* * * * *

UNITED STATES PATENT AND TRADEMARK OFFICE
CERTIFICATE OF CORRECTION

PATENT NO. : 8,831,208 B2
APPLICATION NO. : 13/242695
DATED : September 9, 2014
INVENTOR(S) : David Suendermann et al.

It is certified that error appears in the above-identified patent and that said Letters Patent is hereby corrected as shown below:

<u>In the Claims</u>:

At column 25, claim number 1, line number 28, after "selecting a," please change "oath" to --path--;

At column 25, claim number 1, line number 36, after "the," please change "hest-performing" to --best-performing--;

At column 28, claim number 21, line number 4, please change "configured perform" to --configured to perform--;

At column 28, claim number 22, line numbers 7 to 8, please change "configured perform" to --configured to perform--;

At column 28, claim number 23, line numbers 11 to 12, please change "configured perform" to --configured to perform--;

At column 28, claim number 24, line numbers 16 to 17, please change "configured perform" to --configured to perform--;

At column 28, claim number 25, line numbers 19 to 20, please change "configured perform" to --configured to perform--.

Signed and Sealed this
Eighteenth Day of November, 2014

Michelle K. Lee
*Deputy Director of the United States Patent and Trademark Office*